United States Patent
Menager et al.

(10) Patent No.: US 7,055,336 B2
(45) Date of Patent: Jun. 6, 2006

(54) AIR-CONDITIONING DEVICE FOR VEHICLES, AND METHOD THEREFOR

(75) Inventors: Jean-Luc Menager, Meudon la Foret (FR); Gerard Olivier, Bougival (FR); Laurent Pittion, Metz (FR)

(73) Assignees: Renault, Boulogne (FR); Delphi Technologies, Inc., Troy, MI (US)

( * ) Notice: Subject to any disclaimer, the term of this patent is extended or adjusted under 35 U.S.C. 154(b) by 43 days.

(21) Appl. No.: 10/258,742

(22) PCT Filed: Apr. 20, 2001

(86) PCT No.: PCT/FR01/01222

§ 371 (c)(1),
(2), (4) Date: Apr. 23, 2004

(87) PCT Pub. No.: WO01/83244

PCT Pub. Date: Nov. 8, 2001

(65) Prior Publication Data

US 2004/0182094 A1     Sep. 23, 2004

(30) Foreign Application Priority Data

Apr. 28, 2000 (FR) .................................. 00 05454

(51) Int. Cl.
*B60H 1/00* (2006.01)
(52) U.S. Cl. .................. 62/176.6; 62/151; 62/244; 236/44 C
(58) Field of Classification Search .............. 62/176.1, 62/176.2, 176.3, 176.6, 151, 160, 180, 244; 236/44 A, 44 R, 44 C; 454/75, 121; 165/230, 165/231

See application file for complete search history.

(56) References Cited

U.S. PATENT DOCUMENTS

| 4,932,588 | A | | 6/1990 | Fedter et al. |
| 5,301,515 | A | * | 4/1994 | Iritani et al. ................... 62/126 |
| 5,971,287 | A | * | 10/1999 | Kettner et al. ............ 236/44 A |
| 5,983,649 | A | * | 11/1999 | Aislabie et al. ................ 62/133 |

FOREIGN PATENT DOCUMENTS

| DE | 38 36 559 | 5/1990 |
| DE | 39 07 201 | 9/1990 |
| DE | 198 07 341 | 9/1999 |
| EP | 0 718 165 | 6/1996 |
| WO | 91 12149 | 8/1991 |

* cited by examiner

*Primary Examiner*—Harry B. Tanner
(74) *Attorney, Agent, or Firm*—Jeffrey S. Melcher

(57) ABSTRACT

The invention concerns a method using a system (10) for heating or cooling air in a motor vehicle passenger compartment provided with a windscreen, by input into the passenger compartment air which has passed through an exchanger (12) comprised in a refrigerant loop. The invention is characterized in that it comprises steps which consist in measuring the temperature of the air leaving the exchanger (12), measuring the humidity of the air leaving the exchanger (12), determining the dew point of the air leaving the exchanger (12) based on said temperature and humidity, determining the windscreen temperature, comparing the dew point with the windscreen temperature and stopping the heating of air in the passenger compartment when the dew point is higher than the windscreen temperature.

19 Claims, 4 Drawing Sheets

AIR-CONDITIONING DEVICE FOR VEHICLES, AND METHOD THEREFOR

Figure 1:
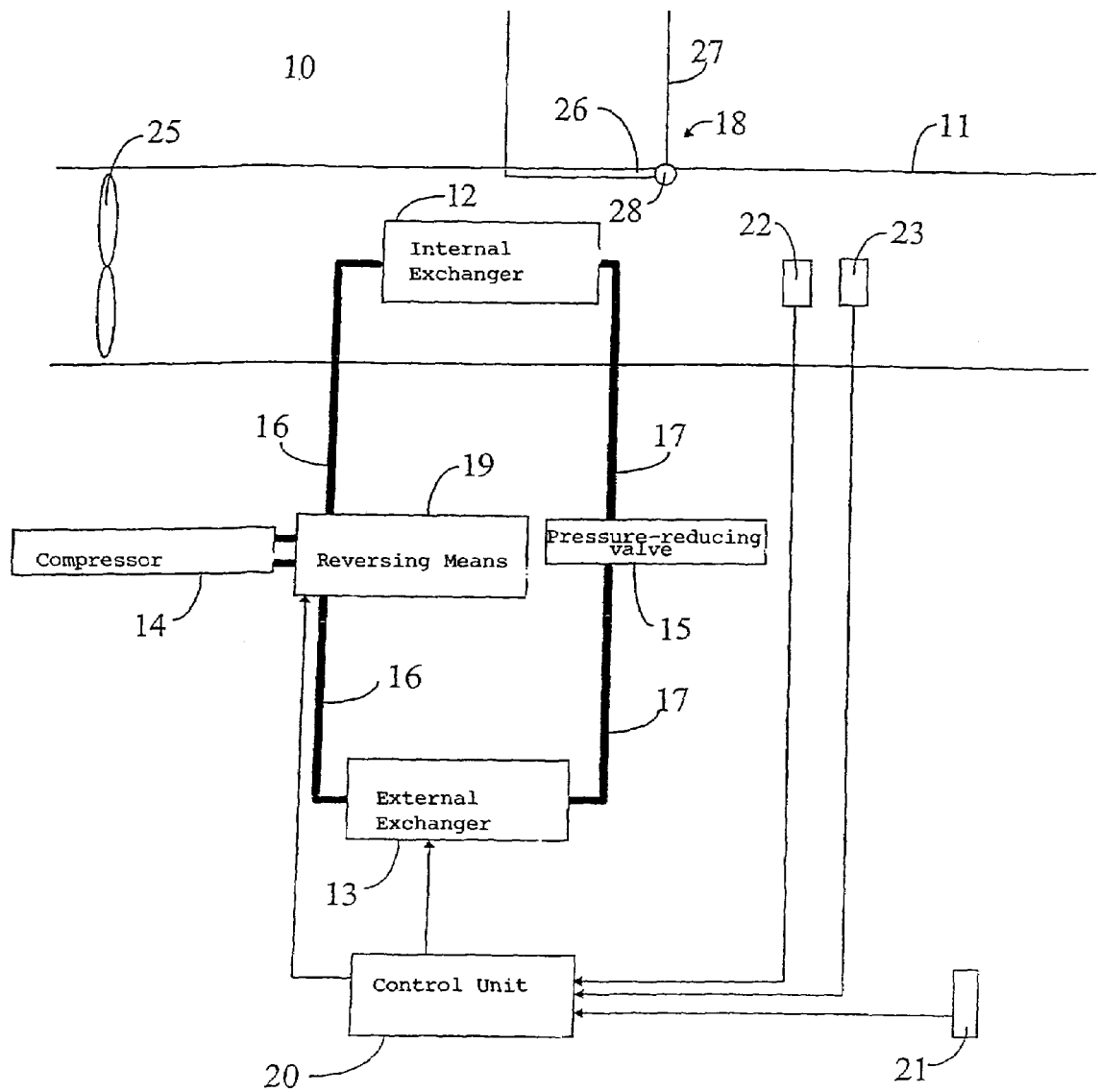

The present invention relates to the technical field of air-conditioning systems of vehicles, and more particularly to an air-conditioning system that ensures both cooling and heating of the air in the passenger compartment of the vehicle. The present invention also relates to a method for use of such systems.

Air-conditioning systems are usually equipped with an external exchanger installed outside the passenger compartment of the vehicle, an internal exchanger installed inside the passenger compartment of the vehicle, a first conduit via which the two exchangers are in communication and in which there is installed a compressor, and a second conduit via which the two exchangers are in communication and in which there is installed a pressure-reducing valve. The assembly formed by the two exchangers, the two lines, the compressor and the pressure-reducing valve is known as the refrigerant loop. A refrigerant fluid is circulated therein.

An air-conditioning system of the type described in the foregoing is capable of heating or cooling the air of the passenger compartment of the vehicle when it is also equipped with means for reversing the direction of circulation of the refrigerant fluid in the refrigerant loop. The refrigerant loop then is termed reversible. In fact, when the refrigerant fluid flows via the internal exchanger, the compressor, the external exchanger and then the pressure-reducing valve, the internal exchanger cools the air that passes through it before being discharged to the passenger compartment of the vehicle. Conversely, when the fluid flows via the internal exchanger, the pressure-reducing valve, the external exchanger and then the compressor, the air passing through the exchanger is heated before being directed toward the passenger compartment.

When the refrigerant loop is used to cool the air being sent to the passenger compartment, the interior exchanger, which functions as an evaporator, collects water, particularly on its walls, due to condensation of part of the humidity present in the air being treated. When the refrigerant loop reversed, operating to heat the air being sent to the passenger compartment, the internal exchanger becomes a condenser, causing rapid evaporation of the water that has accumulated on its walls. When this air reaches the passenger compartment, it can cause extremely rapid condensation on the window surfaces of the vehicle, this phenomenon being known as "flash-fogging", which is a nuisance for the driver of the vehicle.

In one solution, there is used an air-conditioning system equipped with two internal heat exchangers, one dedicated to heating and the other to cooling the air of the passenger compartment.

German Patent 3907210 describes such a system, in which a first internal exchanger functions as a condenser to cool the air passing through it, and a second internal exchanger functions as an evaporator to heat the air passing through it. When the air-conditioning system is used as a heater, the first internal exchanger is idle and, conversely, when the air-conditioning system is used to cool the air of the passenger compartment, the second internal exchanger is idle.

Although the system described in German Patent 3907201 overcomes the problem of "flash-fogging", it requires an additional internal exchanger, which may represent a non-negligible extra cost. Furthermore, the location needed for installation of the second internal exchanger may be incompatible with the constraints of space utilization associated with the vehicle, especially in the motor vehicle industry.

The object of the present invention is to overcome the problem of "flash-fogging" by an air-conditioning system that is capable of both heating and cooling the air of the passenger compartment of a vehicle and that is equipped with only a single internal exchanger.

More particularly, the invention relates to a method for use of a system for heating or cooling the air of a passenger compartment of a vehicle equipped with a windshield, wherein air that has passed through an exchanger belonging to a refrigerant loop is supplied to the passenger compartment, the method comprising the steps of measuring the temperature of the air exiting the exchanger, measuring the humidity of the air exiting the exchanger, determining the dew point of the air exiting the exchanger from the said temperature and humidity, determining the windshield temperature, comparing the dew point with the windshield temperature, and stopping the heating of the air in the passenger compartment when the dew point is higher than the windshield temperature.

According to another characteristic of the invention, the heating of the air in the passenger compartment is stopped by diverting the air passing through the exchanger to the outside of the vehicle.

According to another characteristic of the invention, the air is diverted for a specified duration, or until the dew point becomes lower than the windshield temperature.

According to another characteristic of the invention, the heating of the air in the passenger compartment is stopped by stopping the operation of the refrigerant loop.

According to another characteristic of the invention, the stoppage of the operation of the refrigerant loop lasts for a specified duration or is continued until the dew point is lower than the windshield temperature.

According to another characteristic of the invention, the operation of the refrigerant loop is stopped and disabled until the next restart of the vehicle.

Another object of the invention is to provide, for conditioning the air of the passenger compartment of a vehicle equipped with a windshield, a device of the type comprising a first exchanger installed inside the passenger compartment, a second exchanger installed outside the passenger compartment, first conduits for conveying a refrigerant fluid between the first exchanger and the second exchanger, second conduits for conveying the refrigerant fluid between the first exchanger and the second exchanger, a compressor installed in the first conduits, a pressure-reducing valve installed in the second conduits, reversing means for reversing the direction of circulation of the fluid in the first and second conduits, control means connected electrically to the compressor, and means for evacuation of at least part of the water present in the first exchanger, the said device also being equipped with first measuring means that transmit a signal representative of the temperature of the air exiting the first exchanger, second measuring means that transmit a signal representative of the humidity of the air exiting the first exchanger, the control means being connected electrically to the first and second measuring means and being designed to determine the dew point of the air exiting the first exchanger from the signals transmitted by the first and second measuring means, to determine the windshield temperature, to compare the said dew point and the windshield temperature, and to activate the evacuation means when the dew point is higher than the windshield temperature.

According to another characteristic of the invention, the first exchanger is installed in a main duct communicating at one end with the passenger compartment and at a second end with the outside of the vehicle, the evacuation means comprising at least one secondary duct communicating at a first end with the main duct and at a second end with the outside of the vehicle, and at least one damper designed to shut off the secondary duct or the main duct at least partly, in alternating manner.

According to another characteristic of the invention, the said damper shuts off the main duct downstream from the first exchanger as defined by the direction of circulation of the air in the main duct.

Figure 2:
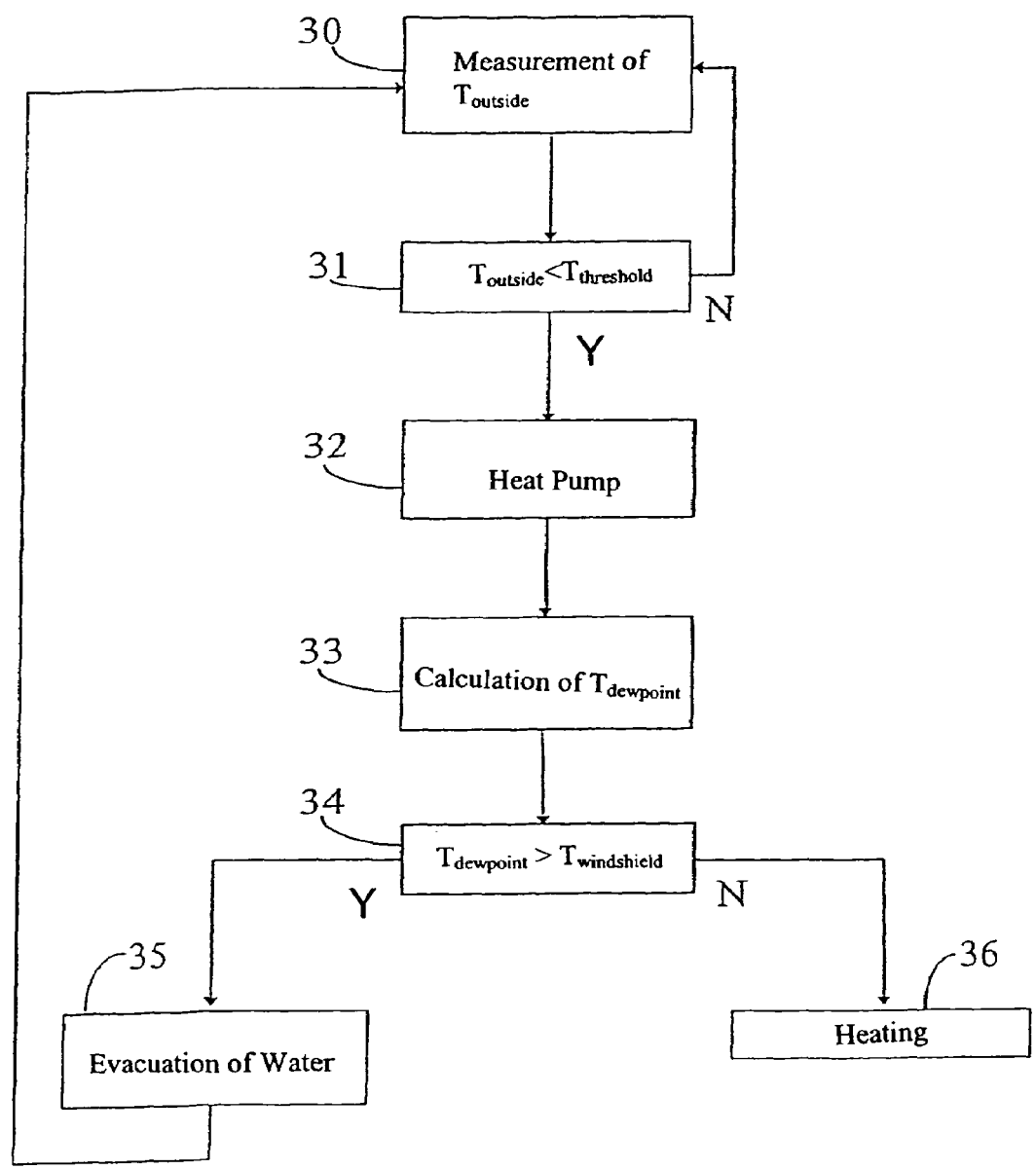
Figure 3:
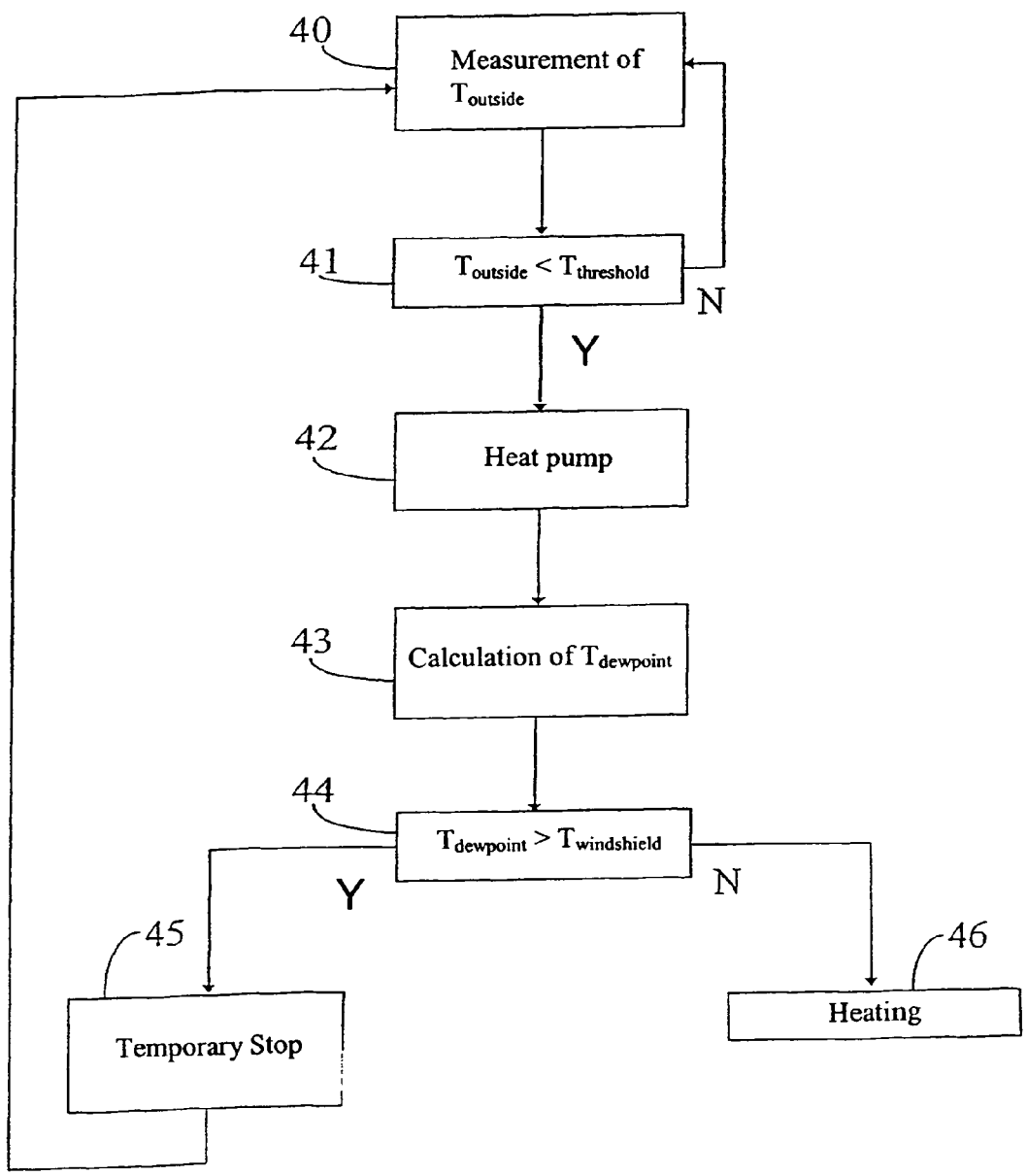
Figure 4:
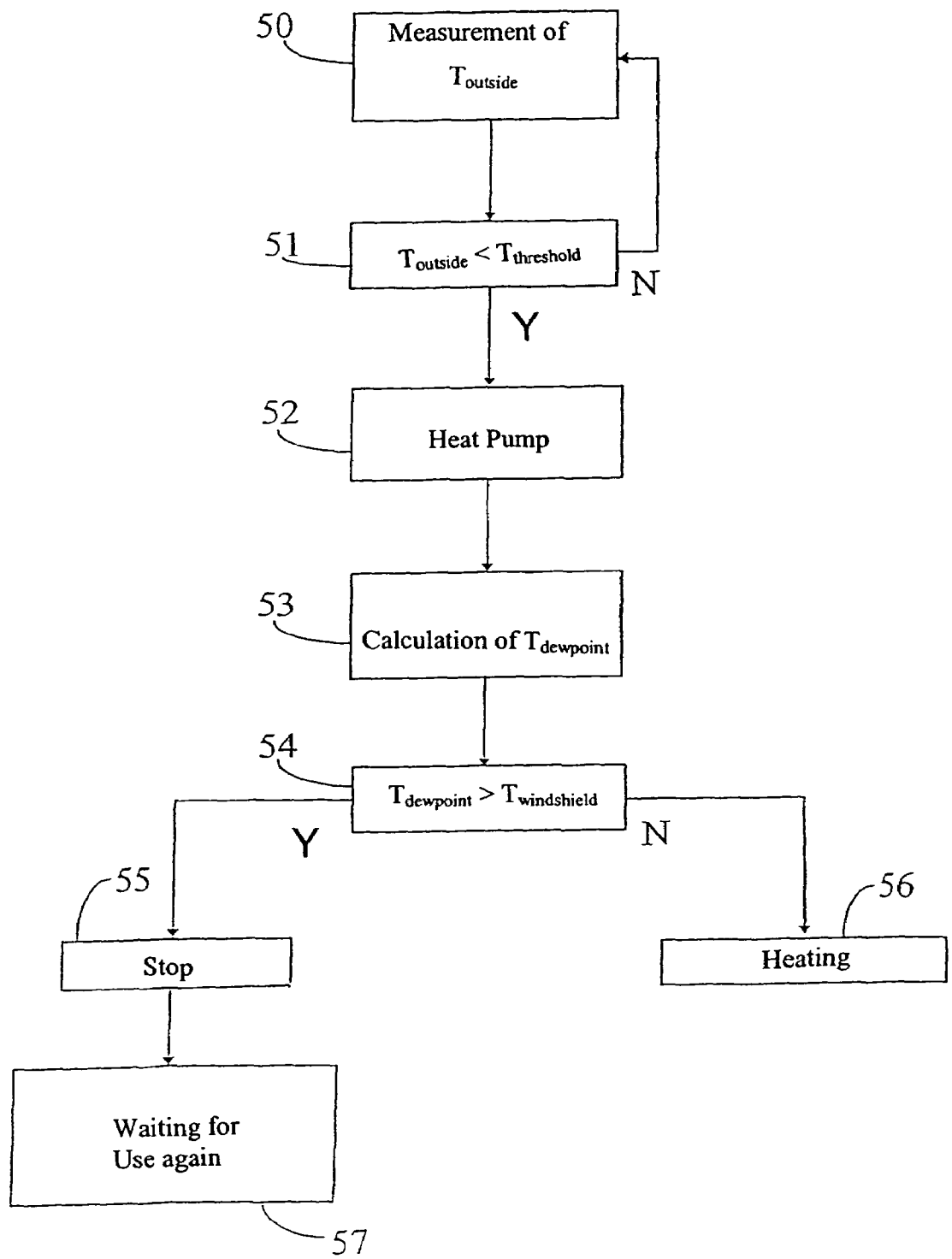

Other characteristics and advantages of the invention will become evident by reading the description hereinafter with reference to the drawings, wherein:

FIG. 1 schematically illustrates an air-conditioning system according to a first embodiment of the invention, FIG. 2 illustrates the diagram of the steps of a first method for use of a first embodiment of the device according to the invention, FIG. 3 illustrates the diagram of the steps of a second method for use of a second embodiment of the device according to the invention, FIG. 4 illustrates the diagram of the steps of a third method for use of a second embodiment of the device according to the invention.

An air-conditioning system 10, illustrated in FIG. 1, intended to heat or cool the air discharged into the passenger compartment (not illustrated) of a vehicle, comprises a refrigerant loop containing an internal heat exchanger 12, which via first and second conduits 16 and 17 respectively is in communication with an external heat exchanger 13.

A compressor 14, associated with reversing means 19, is installed in first line 16, while a pressure-reducing valve 15 is installed in second line 17. A refrigerant fluid circulates in the interior of the refrigerant loop. Reversing means 19 are capable of reversing the direction of circulation of the refrigerant fluid in the refrigerant loop.

Internal exchanger 12 is installed in a main duct 11, which is in communication at a first end with an air-intake port (not illustrated) opening on the outside of the vehicle, and at a second end with the passenger compartment (if necessary via a division into a plurality of ducts). Via the air-intake port, outside air is drawn in by an impeller 25 installed in main duct 11, after which it is passed through internal exchanger 12 and is finally expelled into the passenger compartment of the vehicle.

When the refrigerant fluid flows through external exchanger 13, pressure-reducing valve 15, internal exchanger 12 and then compressor 14, interior exchanger 12 functions as an evaporator and cools the air passing through it.

When the refrigerant fluid flows through external exchanger 13, compressor 14, internal exchanger 12 and then pressure-reducing valve 15, interior exchanger 12 functions as an evaporator and heats the air passing through it.

A control unit 20 is provided to drive reversing means 19 and thus to select whether the mode of operation of the refrigerant loop will be that of a heat pump or of an air cooler. Control unit 20 also drives compressor 14 in such a way that, for example, it controls the energy delivered by internal exchanger 12 when the refrigerant loop is functioning as a heat pump.

Control unit 20 is connected to a first temperature sensor 22 installed downstream from internal exchanger 12 as defined by the direction of circulation of air in main duct 11. First temperature sensor 22 transmits to control unit 20 a signal representative of the temperature $T_{exchanger}$ downstream from internal exchanger 12.

Control unit 20 is connected to a humidity sensor 23 installed in the interior of main duct 11 at a position downstream from internal exchanger 12 as defined by the direction of circulation of air in main duct 11. Humidity sensor 23 transmits to control unit 20 a signal representative of the relative humidity $H_{exchanger}$ downstream from internal exchanger 12.

Control unit 20 is connected to a second temperature sensor 21 installed on the outside of the vehicle. Second temperature sensor 21 transmits to control unit 20 a signal representative of the temperature $T_{outside}$ on the outside of the windshield.

Control unit 20 is further designed to determine the windshield temperature $T_{windshield}$. As an example, it can receive a signal representative of the windshield temperature $T_{windshield}$ by being directly connected to a third temperature sensor (not illustrated), preferably installed inside the vehicle on the windshield, or else by being connected to a multiplexed system with which the vehicle is equipped and on which the signal representative of the windshield temperature $T_{windshield}$ is available. Nevertheless, control unit 20 can calculate an estimate of the windshield temperature $T_{windshield}$ from the signals transmitted by temperature sensor 21 for measuring the air temperature $T_{outside}$ outside the vehicle, by a temperature sensor (not illustrated) for measuring the air temperature inside the passenger compartment, and by a vehicle-velocity sensor, according to a method known to those skilled in the art.

According to a first embodiment of the present invention, main duct 11 is provided with condensate-evacuation means 18, comprising a secondary duct 27, via which main duct 11 is in communication, at a position substantially in the region of internal exchanger 12, with the outside of the vehicle. A damper 26, maneuvered by actuating means 28, can be moved into a first extreme position known as the closed position in order to shut off the end of secondary duct 27 opening into main duct 11. In a second extreme position known as the open position, damper 26 is able to shut off main duct 11 at least partly, and divert the air blown by impeller 25 into secondary duct 27.

Actuating means 28 of damper 26 are driven by control unit 20.

According to a second embodiment of the device according to the present invention, main duct 11 is not equipped with condensate-evacuation means 18, but all other elements are identical.

A first method for use of the first embodiment of the device is illustrated in FIG. 2. In step 30, the control unit receives from second temperature sensor 21 a signal representative of the temperature $T_{outside}$ outside the vehicle. In step 31, control unit 20 compares the value of the temperature $T_{outside}$ outside the vehicle with a threshold temperature $T_{threshold}$ stored in the memory of control unit 20. If the temperature $T_{outside}$ outside the vehicle is higher than the threshold temperature $T_{threshold}$, a return to step 30 takes place.

If the temperature $T_{outside}$ outside the vehicle is lower than the threshold temperature $T_{threshold}$, step 32 begins, at which point control unit 20 then commands the refrigerant loop to operate as a heat pump, if necessary by driving reversing means 19 and compressor 14. If the refrigerant loop is already operating as a heat pump, step 33 begins directly, whereupon the control unit calculates, by a method known to those skilled in the art, the value of the dew point $T_{dewpoint}$ downstream from internal exchanger 12 from the temperature $T_{exchanger}$ and humidity $H_{exchanger}$ downstream from internal exchanger 12.

In step 34, the control unit compares the dew point $T_{dewpoint}$ with the windshield temperature $T_{windshield}$, which is measured or calculated as explained hereinabove. If the dew point $T_{dewpoint}$ is lower than the windshield temperature $T_{windshield}$, heating of the passenger compartment continues in step 36. If the dew point $T_{dewpoint}$ is higher than the windshield temperature $T_{windshield}$, control unit 20 drives condensate-evacuation means 18 in such a way as to evacuate part of the water present on internal exchanger 12. To accomplish this, control unit 20 drives damper 26 to open position and maintains damper 26 open for a specified duration. The air passing through moisture-laden internal exchanger 12 is evacuated to the outside of the vehicle.

The duration for which damper 26 must be open can be determined experimentally so as to ensure sufficient evacuation of the water present on internal exchanger 12. During this time, the control unit drives compressor 14 in such a way that the energy released by the internal exchanger is optimal for saturating the air passing through it with humidity, thus permitting evacuation of the maximum quantity of water. In this way the duration for which damper 26 is open can be prolonged, but without exceeding a specified maximum duration, until the dew point $T_{dewpoint}$ once again drops below the windshield temperature $T_{windshield}$.

The closing of damper 26 is accompanied by a return to step 30.

A second method for using the second embodiment of the device according to the invention, illustrated in FIG. 3, comprises steps 40, 41, 42, 43 and 44, which are respectively identical to steps 30, 31, 32, 33 and 34. In step 44, control unit 20 compares the dew point $T_{dewpoint}$ with the windshield temperature $T_{windshield}$. If the dew point $T_{dewpoint}$ is lower than the windshield temperature $T_{windshield}$, the heating of the passenger compartment is continued in step 46.

If the dew point $T_{dewpoint}$ is higher than the windshield temperature $T_{windshield}$, control unit 20 drives compressor 14, in step 45, in such a way that operation of the refrigerant loop as a heat pump is stopped. The stoppage can be prolonged for a fixed duration or else—but without exceeding a maximum duration—until the dew point $T_{dewpoint}$ once again drops below the windshield temperature $T_{windshield}$.

A third method for using the second embodiment of the device according to the invention, illustrated in FIG. 4, comprises 50, 51, 52, 53, 54, 55 and 56, which are respectively identical to steps 40, 41, 42, 43, 44, 45 and 46 of the second method for using the second embodiment of the device as described in the foregoing. Stoppage of the refrigerant loop in step 55 is followed by step 57, in which control unit 20 disables operation of the refrigerant loop as a heat pump until the vehicle is used again.

The present invention is in no way limited to the embodiment described and illustrated, which was presented merely by way of example. To the contrary, the invention comprises all the technical equivalents of the means described as well as any combinations thereof that satisfy the spirit of the invention.

For example, the reversing means can be integrated with the compressor.

The invention claimed is:

1. A method for use of a system for heating or cooling the air of a passenger compartment of a vehicle equipped with a windshield, wherein air that has passed through an exchanger belonging to a refrigerant loop is supplied to the passenger compartment, the method being characterized in that it comprises the steps of measuring the temperature of the air exiting the exchanger, measuring the humidity of the air exiting the exchanger, determining the dew point of the air exiting the exchanger from the said temperature and humidity, determining the windshield temperature, comparing the dew point with the windshield temperature, and stopping the heating of the air in the passenger compartment when the dew point is higher than the windshield temperature.

2. A method according to claim 1, wherein the heating of the air in the passenger compartment is stopped by diverting the air passing through the exchanger to the outside of the vehicle.

3. A method according to claim 2, wherein the air is diverted for a specified duration.

4. A method according to claim 2, wherein the air is diverted until the dew point becomes lower than the windshield temperature.

5. A method according to claim 4, wherein the diversion of the air is less than a specified maximum duration.

6. A method according to claim 1, wherein the heating of the air in the passenger compartment is stopped by stopping the operation of the refrigerant loop.

7. A method according to claim 6, wherein the stoppage of the operation of the refrigerant loop lasts for a specified duration.

8. A method according to claim 6, wherein the stoppage of the operation of the refrigerant loop is continued until the dew point is lower than the windshield temperature.

9. A method according to claim 8, wherein the diversion of the air is less than a specified maximum duration.

10. A method according to claim 6, wherein the operation of the refrigerant loop is stopped and disabled until the next restart of the vehicle.

11. A method according to claim 1, further comprising reversing the flow of refrigerant in said refrigerant loop.

12. A device for heating or cooling the air of the passenger compartment of a vehicle equipped with a windshield, of the type comprising a first exchanger installed inside the passenger compartment, a second exchanger installed outside the passenger compartment, first conduits for conveying a refrigerant fluid between the first exchanger and the second exchange, second conduits for conveying the refrigerant fluid between the first exchanger and the second exchanger, a compressor installed in the first conduits, a pressure-reducing valve installed in the second conduits, reversing means for reversing the direction of circulation of the fluid in the first and second conduits, control means connected electrically to the compressor, and means for evacuation of at least part of the water present in the first exchanger, characterized in that it is equipped with first measuring means that transmit a signal representative of the temperature of the air exiting the first exchanger, second measuring means that transmit a signal representative of the humidity of the air exiting the first exchanger, the control means being connected electrically to the first and second measuring means and being designed to determine the dew point of the air exiting the first exchanger from the signals transmitted by the first and second measuring means, to determine the windshield temperature, to compare the said dew point and the windshield temperature, and to activate the evacuation means when the dew point is higher than the windshield temperature.

13. A device according to claim 12, wherein the first exchanger is installed in a main duct communicating at one end with the passenger compartment and at a second end with the outside of the vehicle, the evacuation means comprising at least one secondary duct communicating at a first end with the main duct and at a second end with the outside of the vehicle, and at least one damper designed to shut off the secondary duct or the main duct at least partly, in alternating manner.

14. A device according to claim 13, wherein the said damper shuts off the main duct downstream from the first exchanger as defined by the direction of circulation of the air in the main duct.

15. A method for heating or cooling air in a passenger compartment of a vehicle equipped with a windshield using a reversible refrigeration loop having a same internal exchanger for both heating and cooling the air, the method comprising the steps of:

passing air through the internal exchanger;

supplying the air exiting the internal exchanger to the passenger compartment;

measuring the temperature of the air exiting the internal exchanger;

measuring the humidity of the air exiting the internal exchanger;

determining a dew point of the air exiting the internal exchanger from the measured temperature and humidity;

determining the windshield temperature;

comparing the dew point with the windshield temperature; and stopping the flow of the air supplied to the passenger compartment from the internal exchanger when the dew point is higher than the windshield temperature.

16. A method according to claim 15, further comprising the step of stopping the flow of the air to the passenger compartment by diverting the flow of air exiting the internal exchanger to outside of the vehicle.

17. A method according to claim 15, wherein when the flow of the air to the passenger compartment is stopped, further comprising the step of allowing the flow of the air to the passenger compartment when the dew point is lower than the windshield temperature.

18. A method according to claim 15, wherein when the flow of the air to the passenger compartment is stopped, further comprising the step of allowing the flow of the air to the passenger compartment after a set time period.

19. A method according to claim 15, wherein when the flow of the air to the passenger compartment is stopped, further comprising the step of allowing the flow of the air to the passenger compartment after the vehicle is shut off and restarted.

* * * * *